Oct. 21, 1969   B. LEIBINGER   3,473,427
SLOTSHEAR FOR SLOTTING PLATES OF METAL, PLASTIC, ETC., AND
INCLUDING A RECIPROCATING RAM
Filed July 3, 1967
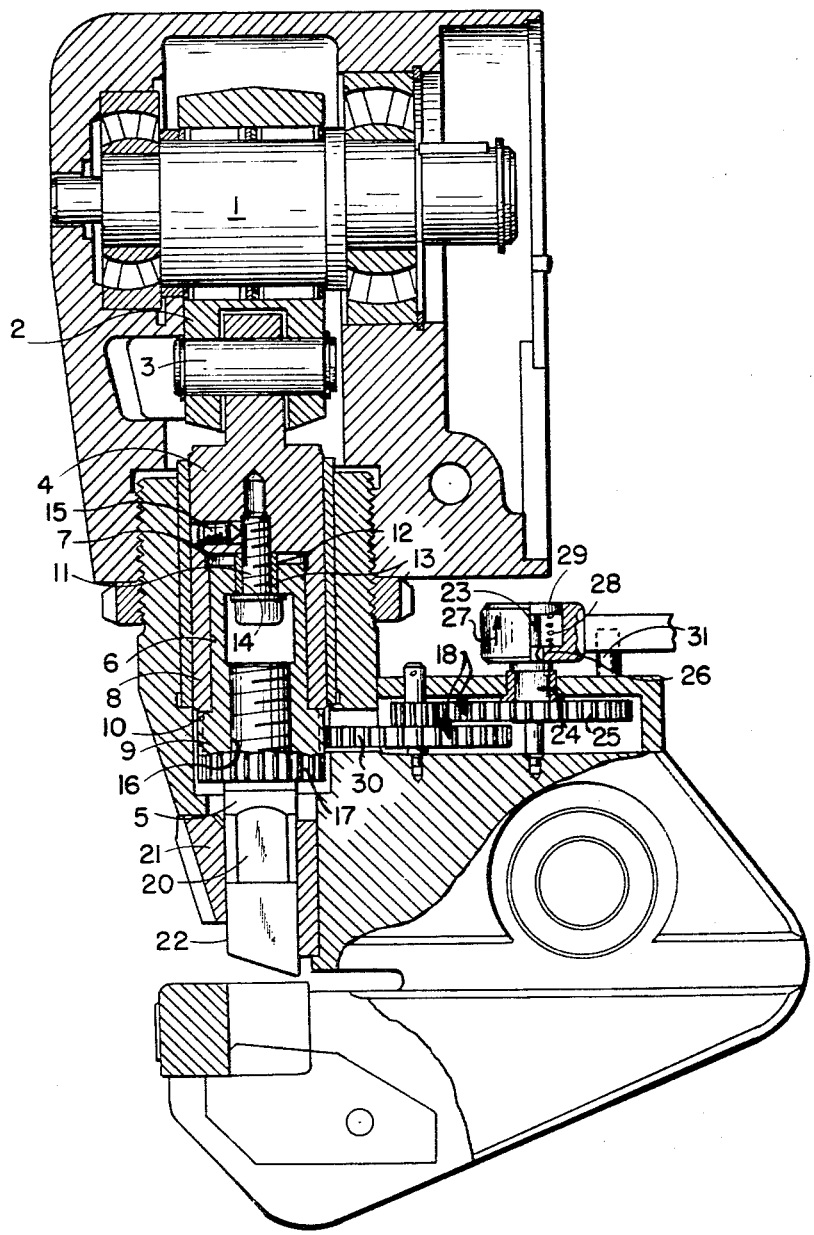
INVENTOR
BERTHOLD LEIBINGER
by
McGlew & Toren
ATTORNEYS United States Patent Office 3,473,427
Patented Oct. 21, 1969

3,473,427
SLOTSHEAR FOR SLOTTING PLATES OF METAL, PLASTIC, ETC., AND INCLUDING A RECIPROCATING RAM
Berthold Leibinger, Gerlingen, near Stuttgart, Germany, assignor to Trumpf & Co., Stuttgart-Weilimdorf, Germany
Filed July 3, 1967, Ser. No. 650,709
Claims priority, application Germany, July 1, 1966, T 31,504
Int. Cl. B26d 5/08
U.S. Cl. 83—527        10 Claims

ABSTRACT OF THE DISCLOSURE

The disclosure is directed to a slot shear for slotting plates of metal, plastic and the like and of the type including a reciprocating ram carrying a cutting or punching tool, two main bottom blades oriented in a plate cutting direction, at least one transverse bottom blade, with the edge of the tool associated with the main bottom blades not cooperating with the cutting edge of the transverse cutting blade during a normal stroke, a bushing threadedly connected to the tool and rotatably but non-axially-displaceably mounted in the ram and externally accessible for rotation thereof, and a tool guide in a shear housing retaining the tool against rotation while providing for relative longitudinal displacement of the tool.

In particular, there is disclosed a hand lever non-removably mounted on the shear housing and connected, through gearing, to the bushing to rotate the same to longitudinally displace the tool into operative relation with the cutting edge of the transverse bottom blade. The gearing includes an external gear on the bushing and a second gear engaged with the external gear, the axial width of the teeth on one of the two gears being sufficiently great that the two gears remain in mesh during the reciprocation of the ram. The handle is axially displaceable with respect to the shaft of a gear to which it is normally coupled, so that the handle may be displaced axially to disengage such coupling, permitting swinging movement of the handle about the axis of the associated gear and reengagement between the handle and the gear at another angular position. A stop is provided to limit rotation of the handle.

Background of the invention

The invention relates to a slot shear for slotting plates of metal, plastic and the like, and of the type including a reciprocating ram carrying a cutting or punching tool. More particularly, the invention is directed to an improvement in a slot shear of a known type whereby adjustment of the tool longitudinally into and out of operative relation with at least one transverse bottom blade can be effected during reciprocation of the ram.

Slot shearing machines of the type to which the present invention is directed are known. In order to cut off the chip, a forked yoke carrying the bottom blade is turned so that the transverse bottom blade and the associated cutting edge of the cutting tool are engaged. In the normal operating position, this yoke is turned down so that only the main bottom blades cut.

For the purpose of mounting the yoke for pivotal movement on the driving head of the shear, the yoke must be provided with corresponding bearings for a bearing pin and, in known arrangements, these bearings are designed as sliding blocks displaceable in longitudinal slots and carrying the pivot. These slots result in an undesirable weakening of the yoke. In order to insure sufficiently safe operation of the machine even under a particularly high stress, for example, when cutting thick plates with blunt blades, this part of the machine must be made particularly strong, and the same holds true for the pivot which is subjected to high shearing stresses.

This leads to an unnecessary increase in weight, which is particularly undesirable in hand tools. In addition, a large stroke movement is required, in cutting thick plates, in order to completely sever the chip. Such a large stroke movement cannot, however, be effected with an eccentric, as otherwise the holding force on a hand lever, necessary during the cutting, will become too great.

The basic setting of the tool is effected, in known machines, from the bottom. The bushing carrying the tool is turned by means of suitable adjusting tools so that the tool, which is threadedly connected with the bushing but is non-rotatable, displaces the ram in an axial direction. However, such a setting can be effected only during standstill of the slot shear, and it is thus not possible, in practice, to completely sever the chip during normal operation.

Summary of the invention

The invention is directed to a slot shear wherein an adjustment of the downward limit of movement of the tool is possible during a stroke of the tool. To this end, the bushing carrying the cutting tool is displaceably coupled, for adjustment during the stroke movement, with a hand lever irremovably connected with the housing of the shear.

Thereby, the pivotal mounting of that part of the shear carrying the bottom blades can be eliminated, so that the pivots, as well as the longitudinal slots in the forked yoke necessary for their support, can also be eliminated. The overall weight of the machine can be decreased, while the machine is still capable of withstanding high stresses. In order to sever the chip, the hand lever, which is irremovably connected with or mounted on the shear housing, is turned or angularly displaced, so that the bushing is rotated about its axis, this rotation being transformed into longitudinal displacement of the tool. The bottom dead center position of the tool thus can be adjusted to a lower level, so that the cutting edge of the transverse bottom blade cooperates with the associated edge of the tool so that the chip can be severed.

It is particularly advantageous that the bushing is provided with an external gear, and the hand lever is mounted on the shaft of a pinion or geatr included in gearing meshing with the external gear on the bushing. The axial width of the teeth of either the external gear on the bushing or a gear meshing with such external gear is increased by substantially the length of the stroke of the cutting tool. Since the external gear on the bushing performs a reciprocating movement, due to the movement of the ram relative to the gear meshing with such external gear, it is necessary to make the axial width of the teeth on one of the two gears greater by an amount corresponding to the length of stroke of the ram. Thereby, the two gears remain in mesh in any position of the ram. If at least one one intermediate gear is positioned between the pinion to which the handle is secured and the external gear on the bushing, it is possible to transmit the hand lever movement therethrough and thus to change the direction of movement of the hand lever.

In accordance with a further feature of the invention, the hand lever is detachably coupled with the shaft of a pinion, so that it can be suitably oriented in accordance with the prospective use. It is of particular advantage if the hand lever is connected with the shaft of the pinion by interengaging polygonal cross sections, gearing, or the like. The handle thus can be rapidly shifted axially with the positive connection with the shaft preventing turning of the handle about its axis relative to the shaft.

Preferably, the hand lever is displaceably mounted at the free end of its mounting shaft, which carries a stop limiting outward movement of the hand lever. The pull-out stop is so located that, when the handle is engaged therewith, the polygonal or the like section of the hand lever is disengaged from the corresponding mating section of the pinion shaft so that, for different orientation of the hand lever, the latter can be pulled up against its stop so that the positive connection of the hand lever with the pinion shaft is disengaged. Subsequently, the handle is turned by a desired amount and again lowered. A spring may be provided to bias the handle in the downward or engaging position. It is necessary that the polygonal shaft or the like be in the correct position relative to the polygonal bore or the like of the hand lever, so that the hand lever can be shifted only in steps with respect to the pinion. Preferably, a limiting stop is provided to limit angular displacement of the hand lever so that shifting movement of the tool also can be limited. With the provision of such a limiting stop, it is possible to effect the basic setting of the tool with respect to the bottom blades.

An object of the present invention is to provide, in a slot shear, an improved means for adjusting the bottom dead center position of the tool relative to associated cutting blades.

Another object of the invention is to provide such a slot shear in which the adjustment may be effected during reciprocation of the tool by a ram connected thereto.

A further object of the invention is to provide such a slot shear in which a bushing, which is threadedly engaged with the tool, carries an external gear meshing with manually operated gearing for rotating the bushing and thus adjusting the tool longitudinally of itself.

Still another object of the invention is to provide such a slot shear in which the external gear on the bushing and the gear of the gearing meshing therewith are so designed as to remain always in mesh during reciprocation of the ram carrying the tool.

A further object of the invention is to provide such a slot shear in which an operating hand lever for the adjustment is irremovably secured to the housing of the shear but is disengageably coupled to the gearing for adjusting the bushing, whereby the relative angular orientation of the hand lever may be adjusted without movement of the gearing.

Yet, another object of the invention is to provide a slot shear of the type mentioned including means limiting relative axial movement of the hand lever and the gear or pinion to which it is coupled.

A further object of the invention is to provide a slot shear of the type just-mentioned including means limiting the range of angular displacement of the hand lever.

Brief description of the drawings

For an understanding of the principles of the invention, reference is made to the following desecription of a typical embodiment thereof as illustrated in the accompanying drawing.

In the drawing the single figure is an elevation view, partly in longitudinal section, of a slot shear embodying the invention.

Description of the preferred embodiment

Referring to the drawing, the slot shear includes a rotatable shaft having an eccentric shaft portion 1 on which is arranged a connecting rod 2. Connecting rod 2 carries a connecting pin 3 by means of which it is articulatedly connected to a ram 4 transmitting the reciprocating movement of rod 2 to a cutting tool 5 connected to the ram 4. Connection between ram 4 and tool 5 is effected by means of a bushing 6 inserted into a bore 7 at the lower free end 8 of ram 4. Bushing 6 is formed with a collar 9 which engages the end 10 of the portion 8 of ram 4, and bushing 6 is secured against axial displacement relative to ram 4 by a cap screw 11.

Cap screw 11 extends through a sleeve or bushing 13 in a relatively small diameter bore 12 extending axially through the upper end of bushing 6, and the inner surface 14 of sleeve 13 has dimensions such that bushing 6 can be turned relative to cap screw 11, which latter is secured against rotation by a safety set screw 15. In order to permit such turning of bushing 6, it is further necessary that collar 9 thereof be not pressed too firmly against end surface 10 of ram 4, as otherwise rotation of bushing 6 would be prevented.

Bushing 6 is internally threaded with a female thread 16 which is engageable with a male thread on cutting tool 5. Collar 9 of bushing 6 is formed with an external gear 17 connected, through a transmission 18, with a hand lever 19 so that a pivotal movement of hand lever 19 is transmitted, through transmission 18, to bushing 6. The end of cutting tool 5 carrying the cutting edge is formed with a polygonal, and preferably rectangular, cross section 20 which is engaged in a correspondingly shaped bore of a guide 21. Thus, rotary movement of bushing 6, effected by pivotal movement of hand lever 19, is transformed into a translatory movement of tool 5 through the medium of thread 16 and by virtue of guide 21 preventing rotation of tool 5. Due to this translatory movement of tool 5, tool 5 is displaced downwardly relative ram 4 so that the cutting edge 22 of tool 5 cooperates with the transverse bottom blade to sever the chip. The hand lever 19 is returned to its original position either manually or by a return spring, which latter has not been illustrated.

Hand lever 19 is disengageably coupled with the free upper end 23 of hub or shaft 24 of a pinion 25 forming part of the transmission 18. The positive rotational connection between hand lever 19 and shaft or hub 24 is effected through the medium of a spur gearing 26, but spur gearing 26 could be replaced by a simple polygonal connection involving a polygonal bore and a correspondingly shaped shaft engaged in the bore. If hand lever 19 is moved upwardly in the direction of arrow 27, spur gearing 26 is disengaged and, at the same time, a return spring 28 is tensioned. Hand lever 19 can now be rotated about its axis without rotation of gear or pinion 25, and be re-coupled to end 23 of shaft or hub 24 in the new angular position of the hand lever, with the teeth and gaps of spur gearing 26 coinciding.

To prevent complete disengagement of hand lever 19 from shaft 24, a collar 29, serving as a pull-out stop, is provided at the upper end of shaft 24 and serves simultaneously as an abutment for return spring 28. For assembly reasons, shaft 24 consists of two parts joined to each other by screws, with the upper part carrying collar 24. A spur gear and pinion member 30, forming part of transmission 18, interconnects pinion or gear 25 and the external gear 17 on collar 9 of bushing 6.

A stop 31 is provided to limit angular displacement of hand lever 19. By means of stop 31, as well as by the possibility of angular setting of hand lever 19 through disengagement of spur gearing 26, it is possible to adjust the distance of tool 5 from the transverse bottom blade. In addition, tool 5 can be unscrewed from bushing 6 by repeated turning and shifting of hand lever 19.

In order that the external gear 17 of bushings 6 and pinion 30 of transmission 18 remain in engagement during the stroke movement of the ram, external gear 17 has its teeth made wider axially than those of pinion 30 by the amount of the stroke movement. It will be appreciated that, alternatively, the axial width of the teeth of gear 30 could be made greater than the axial width of external gear 17 by the amount of the stroke, and the same effect accomplished.

While a specific embodiment of the invention has been shown and described in detail to illustrate the application of the principles of the invention, it will be understood that the invention may be embodied otherwise without departing from such principles.

What is claimed is:

1. In a slot shear for slotting plates of metal, plastic and the like, and of the type including a reciprocating ram carrying a cutting or punching tool, two main bottom blades oriented in a plate cutting direction, at least one transverse bottom blade, the edge of the tool associated with the main bottom blades not cooperating with the cutting edge of the transverse bottom blade during a normal stroke, a bushing threadedly connected to the tool and rotatably but non-axially-displaceably mounted in the arm and externally accessible for rotation thereof, and a tool guide in the shear housing retaining the tool against rotation while providing for relative longitudinal displacement thereof: the improvement comprising, in combination, a hand lever pivotally and non-removably mounted on the shear housing; and means disengageably coupling said bushing and said hand lever for angular displacement of said bushing during the stroke movement.

2. In a slot shear, the improvement claimed in claim 1, including an external gear on said bushing; a second gear meshing with said external gear and operatively engaged with said hand lever; the axial width of the teeth of one of said gears being greater than the axial width of the teeth of the other of said gears by substantially the amplitude of the stroke movement of the cutting tool.

3. In a slot shear, the improvement claimed in claim 2, in which said second gear forms part of a transmission including a gear having a mounting shaft; said hand lever being disengageably coupled to said mounting shaft.

4. In a slot shear, the improvement claimed in claim 3, in which said transmission includes at least one gear intermediate the gear to which said hand lever is coupled and the external gear on said bushing.

5. In a slot shear, the improvement claimed in claim 3, in which the coupling of said hand lever to said shaft provides for relative axial displacement of said hand lever and said shaft to uncouple said hand lever from said shaft.

6. In a slot shear, the improvement claimed in claim 5, in which the coupling between said hand lever and said shaft comprises a polygonal shaft portion having mating engagement in a polygonal bore.

7. In a slot shear, the improvement claimed in claim 5, in which the coupling between said hand lever and said shaft comprises spur gearing.

8. In a slot shear, the improvement claimed in claim 5, in which said hand lever is mounted for axial displacement at the free end of said shaft; and a pull-out stop on the free end of said shaft limiting outward axial movement of said hand lever to a position in which said coupling is disengaged.

9. In a slot shear, the improvement claimed in claim 5, including a stop limiting angular displacement of said hand lever about the axis of said shaft.

10. In a slot shear, the improvement claimed in claim 8, including a spring engaged between said pull-out stop and said hand lever and biasing said hand lever into a position coupled to said shaft.

References Cited

UNITED STATES PATENTS

| | | | |
|---|---|---|---|
| 1,047,634 | 12/1912 | Hoffmann | 145—76 X |
| 1,795,303 | 3/1931 | Gray | 83—635 X |
| 3,133,494 | 5/1964 | Hecht | 83—527 X |

FOREIGN PATENTS 39,539    5/1964    Germany.

ANDREW R. JUHASZ, Primary Examiner

Z. R. BILINSKY, Assistant Examiner

U.S. Cl. X.R.

83—635, 640, 700, 916